G. A. ERICKSON.
Cultivator.
No. 39,724. Patented Sept. 1, 1863.
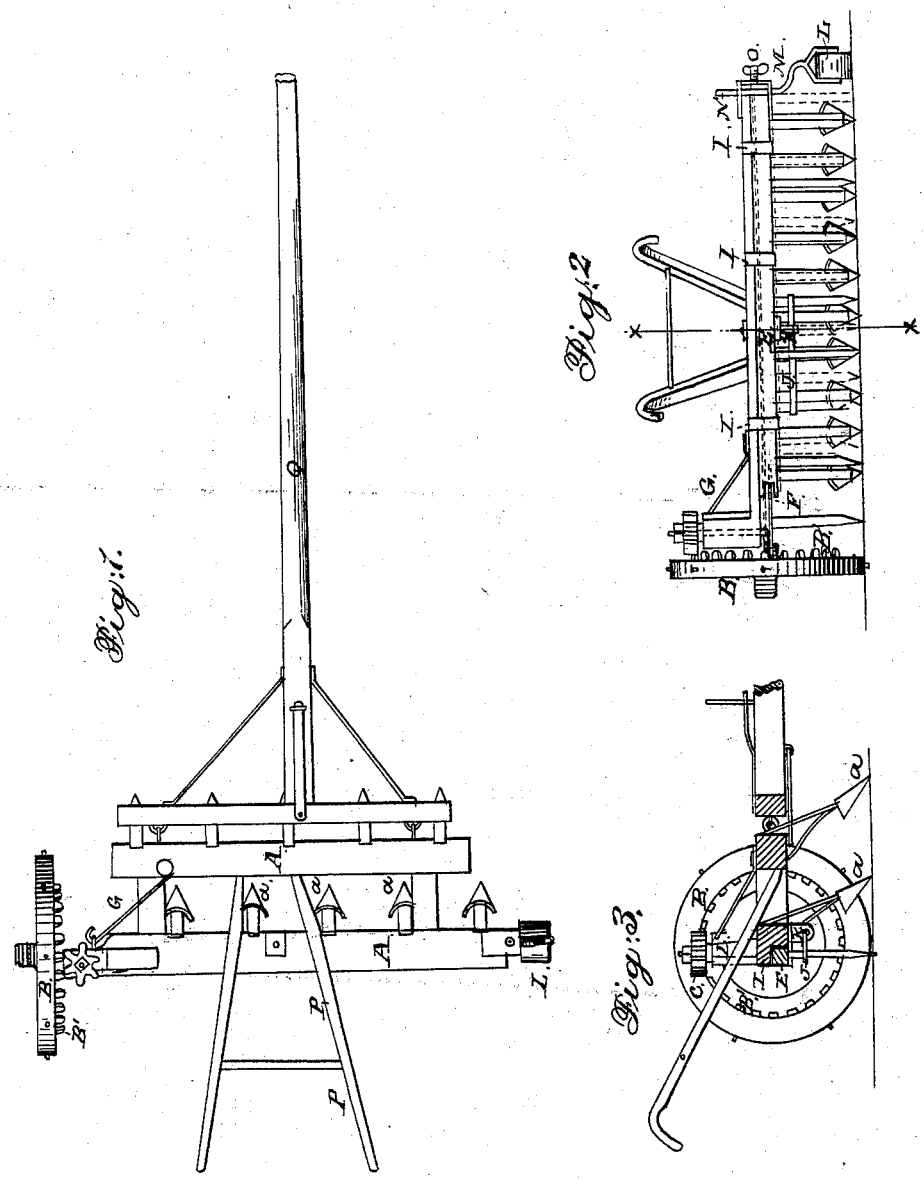
WITNESSES:
INVENTOR:

UNITED STATES PATENT OFFICE.

G. A. ERICKSON, OF SWEED BEND, IOWA.

IMPROVEMENT IN CULTIVATORS.

Specification forming part of Letters Patent No. 39,724, dated September 1, 1863.

*To all whom it may concern:*

Be it known that I, GUSTAF A. ERICKSON, of Sweed Bend, in the county of Webster and State of Iowa, have invented a certain new and useful Improvement in Cultivators; and I do hereby declare the following to be a full and exact description of the same, reference being had to the accompanying drawings, making part of this specification, in which—

Figure 1 is a plan or top view of my improved cultivator. Fig. 2 is a rear end elevation of the same. Fig. 3 is a vertical section of the same at $x$ $x$, Fig. 2.

Similar letters of reference indicate corresponding parts in the several views.

This invention consists in the application of an improved vibrating harrow to a cultivator, in manner substantially as hereinafter described.

To enable others skilled in the art to which my invention appertains to fully understand and use the same, I will proceed to describe it.

A is the main frame of the implement, in which are secured any desired number of cultivator-teeth, $a$ $a$ $a$.

B represents the main driving-wheel, to the inder side of which a concentric cogged rim, B', is rigidly attached.

C is a pinion supported upon a standard, D, and running on a vertical crank-shaft, $c$. The cogged rim B' of the wheel B, gearing with the pinion C, communicates a lateral vibratory motion to the harrow E through the medium of a connecting-rod, F, which is jointed at its respective ends to the lower end of the vertical crank-shaft $c$ and to the harrow E.

G may represent a brace, of iron or other suitable material, extending from the front part of the frame A to the standard D, to the front of which it is attached, near its upper edge, for the purpose of imparting strength and rigidity thereto.

I represents guide-straps, by which the vibrating harrow E may be secured and held in position at the rear edge of the frame A, said straps being so formed as to permit the free endwise play of the harrow while the machine is in motion.

J represents a guide-rod, which serves as an additional supporting and guiding medium for the harrow, and works through one or more lugs K, which may be secured to the under rear part of the frame in any convenient way.

L represents a roller attached to the lower end of an adjustable forked stem, M, said stem being adjusted at any desired height in the bracket by means of a clamp-screw, O, or otherwise, for the purpose of elevating the teeth of the harrow and cultivator from the ground when the machine is passing over fields or places not to be tilled.

P Q represent respectively the handles and tongue of the machine, which may be of common construction.

Having thus described my invention, what I claim therein as new, and desire to secure by Letters Patent, is—

The described combination of a vibrating harrow, E, with a cultivator, the whole being constructed and arranged to operate in the manner and for the purposes herein specified.

GUSTAF A. ERICKSON.

Witnesses:
C. J. A. ERICSON,
THOMAS OLSEN.